(12) United States Patent
Wiezoreck et al.

(10) Patent No.: US 8,154,157 B2
(45) Date of Patent: Apr. 10, 2012

(54) PRIMARY PART OF A LINEAR MOTOR AND LINEAR MOTOR THEREWITH

(75) Inventors: Jan Wiezoreck, Bonn (DE); Carsten Bührer, Bonn (DE)

(73) Assignee: Zenergy Power GmbH, Reinbach (DE)

( * ) Notice: Subject to any disclaimer, the term of this patent is extended or adjusted under 35 U.S.C. 154(b) by 1006 days.

(21) Appl. No.: 12/093,231

(22) PCT Filed: Nov. 14, 2006

(86) PCT No.: PCT/EP2006/010913
§ 371 (c)(1),
(2), (4) Date: May 9, 2008

(87) PCT Pub. No.: WO2007/054366
PCT Pub. Date: May 18, 2007

(65) Prior Publication Data
US 2008/0274897 A1    Nov. 6, 2008

(30) Foreign Application Priority Data
Nov. 14, 2005 (DE) .......................... 10 2005 054 531

(51) Int. Cl.
*H02K 41/02* (2006.01)
(52) U.S. Cl. ............... 310/12.29; 310/12.21; 310/12.25; 310/54
(58) Field of Classification Search ............... 310/12.29, 310/15, 12.21–12.26, 54
See application file for complete search history.

(56) References Cited

U.S. PATENT DOCUMENTS

| | | | | |
|---|---|---|---|---|
| 1,384,864 A | * | 7/1921 | Shepherd | 310/54 |
| 3,056,055 A | * | 9/1962 | Willyoung et al. | 310/61 |
| 3,249,775 A | * | 5/1966 | Baylac | 310/54 |
| 3,303,368 A | * | 2/1967 | Cohen et al. | 310/105 |
| 3,835,339 A | * | 9/1974 | Laronze | 310/13 |
| 3,906,261 A | * | 9/1975 | Ogura et al. | 310/12.07 |
| 3,911,706 A | | 10/1975 | Davis | |
| 4,342,932 A | | 8/1982 | Glebov et al. | |
| 4,514,652 A | * | 4/1985 | Olson | 310/54 |
| 4,692,673 A | | 9/1987 | Delong | |
| 5,489,810 A | * | 2/1996 | Ferreira et al. | 310/54 |
| 5,523,635 A | * | 6/1996 | Ferreira et al. | 310/71 |

(Continued)

FOREIGN PATENT DOCUMENTS
DE    42 17 357 C2    12/1993
(Continued)

OTHER PUBLICATIONS
International Search Report, PCT/EP2006/010913, Feb. 22, 2007.
(Continued)

*Primary Examiner* — Quyen Leung
*Assistant Examiner* — Alex W Mok
(74) *Attorney, Agent, or Firm* — Fay Sharpe LLP

(57) ABSTRACT

The invention relates to a primary part of a linear motor having a receptacle for a secondary part which can move along an axis in the receptacle, having a plurality of annular coils which are arranged coaxially with respect to the receptacle, and having a yoke, with teeth which are composed of a soft-magnetic material being arranged or formed between the end faces of adjacent coils. In order to provide a primary part or a linear motor which has a high power density in a compact form and allows good cooling with coolant, cooling gaps in which spacers are arranged are formed between the end faces of the coils and the teeth.

20 Claims, 3 Drawing Sheets

U.S. PATENT DOCUMENTS

| | | | | |
|---|---|---|---|---|
| 5,668,090 A * | 9/1997 | Kalsi | | 505/166 |
| 6,323,567 B1 * | 11/2001 | Hazelton et al. | | 310/12.29 |
| 6,329,728 B1 | 12/2001 | Kitazawa et al. | | |
| 6,570,273 B2 * | 5/2003 | Hazelton | | 310/12.25 |
| 6,856,053 B2 * | 2/2005 | LeFlem et al. | | 310/54 |
| 2002/0047314 A1 * | 4/2002 | Takedomi | | 310/12 |
| 2002/0180284 A1 * | 12/2002 | LeFlem et al. | | 310/54 |
| 2003/0141769 A1 * | 7/2003 | Kubo | | 310/12 |
| 2005/0006959 A1 | 1/2005 | Hoppe et al. | | |
| 2007/0001521 A1 * | 1/2007 | Kruip et al. | | 310/12 |

FOREIGN PATENT DOCUMENTS

| | | |
|---|---|---|
| DE | 103 17 993 A1 | 11/2004 |
| DE | 10320553 A1 * | 12/2004 |
| EP | 0 774 826 B1 | 5/1997 |
| EP | 1233501 A2 * | 8/2002 |
| JP | 54044710 A * | 4/1979 |
| JP | 57091664 A * | 6/1982 |
| JP | 57091665 A * | 6/1982 |
| JP | 05328669 A * | 12/1993 |
| JP | 10285906 A * | 10/1998 |
| WO | WO 01/48888 A2 | 7/2001 |
| WO | WO 02/089302 A1 | 11/2002 |
| WO | WO 03/015247 A1 | 2/2003 |

OTHER PUBLICATIONS

International Preliminary Report and Written Opinion, Jun. 11, 2008.
German Office Action, Sep. 7, 2009.

* cited by examiner

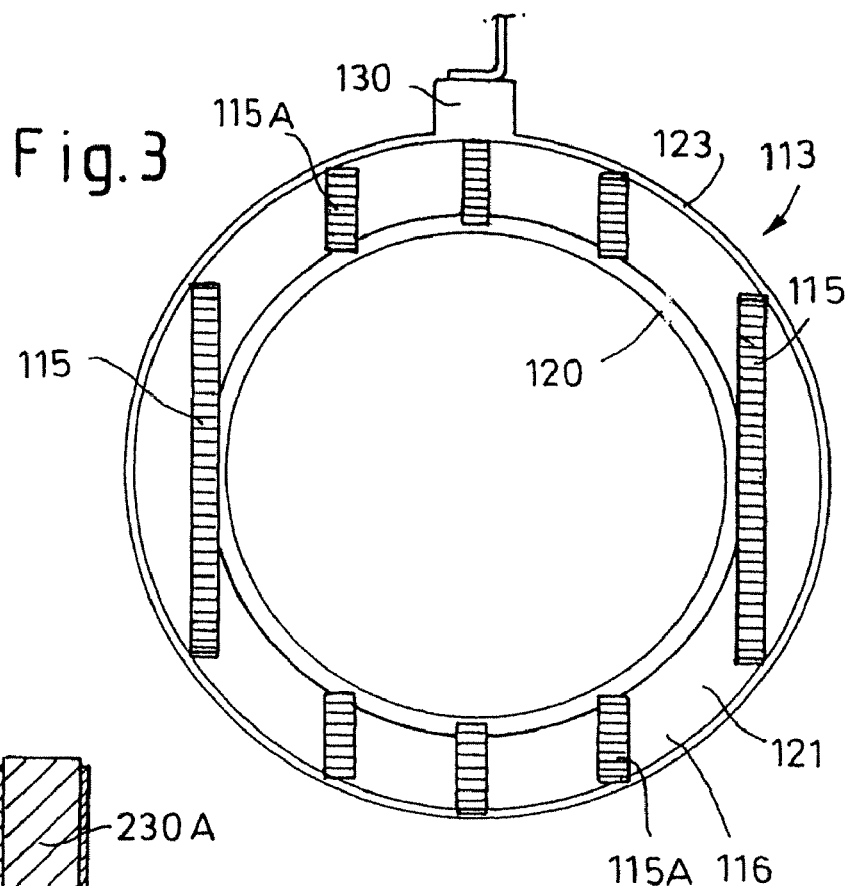
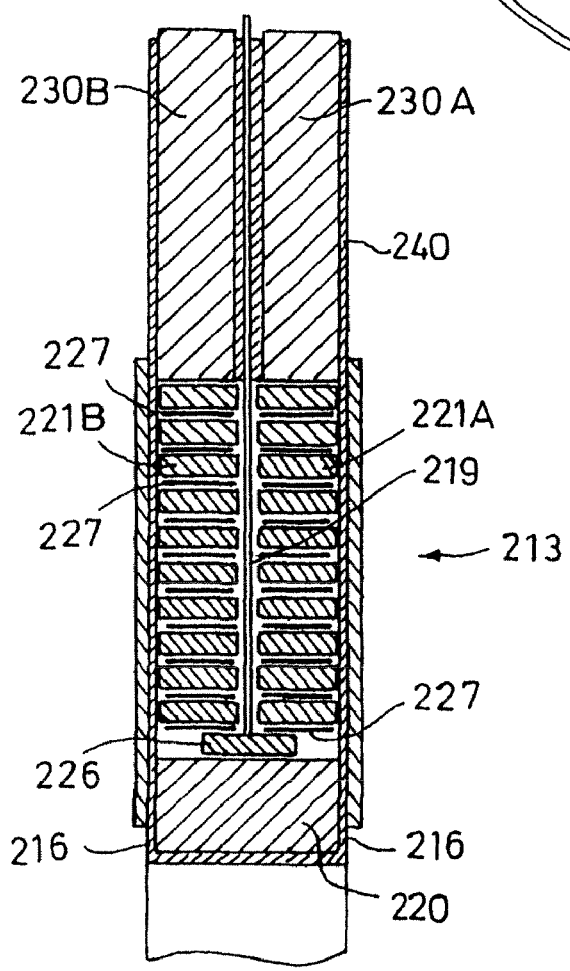

PRIMARY PART OF A LINEAR MOTOR AND LINEAR MOTOR THEREWITH

CROSS-REFERENCE TO RELATED APPLICATIONS

This application is a national stage entry of international application number PCT/EP2006/010913, having international filing date Nov. 14, 2006, which was not published in English, which claims priority to German patent application number DE102005054531.9, filed Nov. 14, 2005, the entirety of which is hereby incorporated by reference.

FIELD OF THE INVENTION

The invention relates to a primary part of a linear motor having a receptacle for a secondary part which can move along a shaft in the receptacle, having a plurality of preferably annular coils which are arranged coaxially with respect to the receptacle, and having a yoke which surrounds the coils on a coil circumference, with teeth composed of a soft-magnetic material being arranged between end faces of adjacent coils and with each coil having at least one winding, which can be cooled by a suitable coolant, preferably with turns of a high temperature superconductor wound densely on a winding former. The invention also relates to a linear motor having a primary part such as this and having a secondary part which can move with it.

BACKGROUND

A linear motor of this generic type with coils composed of high-temperature superconductors (HTS conductors) is known from EP 0 774 826 B1. Alternating current is applied to the superconducting windings of a primary part or stator in order to excite the linear motors of this generic type in order to produce a variable magnetic field in the receptacle of the primary part, for a secondary part. The magnetic field moves the primary part and secondary part relative to one another. The turns of the winding are located one on top of the other and are generally densely wound in order to allow the winding to have a large number of turns, but with the coil having a compact form. Coils with windings such as these are particularly suitable for manufacturing very powerful linear motors. Teeth composed of soft-magnetic material are arranged between the coils in order to strengthen the magnetic flux, and are surrounded by a yoke as a magnetic return path for the primary part. In the prior art, the coils rest on the teeth in order to produce as high a magnetic flux density as possible in the receptacle.

The superconducting coils to which alternating current is applied must be cooled during operational use in order to change the high-temperature superconductor to a superconducting state. The magnetic field which is formed when alternating current is passed through the coils of the primary part induces eddy currents in the teeth and in the yoke which produce heat losses in the same way as hysteresis in the coils and in the soft magnetic iron, which must be dissipated by cooling using the coolant.

SUMMARY

The object of the invention is to provide a primary part, which can be excited by an alternating current and has superconducting coils, of a linear motor and a corresponding linear motor which allow adequate cooling with a coolant, even with a high power density, with simple production and in a compact form.

According to the invention, this object is achieved in that the coils have densely wound turns and cooling gaps in which spacers are arranged are formed between the end faces of the coils and the teeth. The cooling gaps provided between the teeth and the coils ensure that a coolant which is used to cool the superconductor coils during operation of a linear motor such as this directly reaches the elements to be cooled, in particular such as the coils, but also the teeth. The heat which has been created in particular by hysteresis and eddy currents is effectively dissipated directly where it is created without the restricted thermal conductivity of the material used for the yoke or the teeth being able to detract from the cooling performance. The coolant which fills and flows through the cooling gaps in the primary part during operation can cool both the coils and the teeth at the same time and, in particular, the coolant can flow over a large area around the end faces of the coils, surrounding them, during operational use. The spacers in the cooling gaps at the same time prevent the magnetic forces being able to lead to deformation or position changes of the coils, and thus to adverse effects on or reductions in the size of the cooling gaps. The densely wound windings of the coils in this case ensure that the coils have a high effective current density.

The cooling gaps preferably have a gap thickness which is greater than the mean or maximum diameter of gas bubbles which are created during heat dissipation by means of the coolant, in particular as a result of the coolant changing phases during this process from liquid to gaseous. If the coolant in the cooling gap is heated by heat losses the cooling gaps, which are of an appropriate sufficiently large size, ensure that the gas bubbles do not remain in the cooling gap between the end face of the coil and the tooth which is in each case at a distance from it. The cooling gaps ensure that the gas bubbles are reliably carried away by means of and in the coolant. The gas bubbles which may be formed can preferably be carried away by virtue of their own buoyancy in the coolant, thus by design preventing the risk of overheating of the coils as a result of accumulation of gas bubbles in the cooling gap and, associated with this, the cooling effect of the coolant being adversely effected or prevented. The process of carrying away can also be achieved or assisted by a forced flow of the coolant. The gap thickness is preferably at the same time sufficiently small that the power density of the primary part is not decreased, or is decreased only slightly, by a reduction in the magnetic flux. The cooling gaps formed by the spacers preferably have a gap thickness which is essentially the same as or less than twice the mean gas bubble size of the coolant gas bubbles formed on a phase transition. In particular, nitrogen can be used as the coolant. The gap thickness of the nitrogen may, for example, be about 0.7 mm☐10%. Furthermore, if nitrogen is used as the coolant, the gap thickness can preferably be less than about 1.4 mm+/−10%.

According to one advantageous refinement, the spacers can fill less than 25% of the cooling gap, preferably less than 20% of it, and in particular less than 15% of it, thus ensuring during operation of the primary part that the coils and the teeth make contact with coolant over a large area.

The end faces of the respectively used superconducting coils are expediently closed to be coolant-tight, which has the advantage that the power handling capability and effective current density of the coil are not adversely affected by hollow cavities between the turns. The windings of the coils are preferably encapsulated in an encapsulation compound, for example composed of plastic, thus protecting the densely wound turns and fixing them in their position with respect to one another. According to one particularly preferred refinement, the winding is wound from a high temperature superconductor in the form of a strip, furthermore with the individual turns preferably being isolated or insulated from one another by an insulation film. The turns formed by the HTS conductor wire in the form of a strip are preferably wound densely one on top of the other in order to provide the coil with as many turns as possible, but in a compact form. The high temperature superconductor may be manufactured using the powder-in-tube technique or may be in the form of a thin-film conductor or a stack of thin-film conductors. The coil is expediently in the form of a double-disk coil—a so-called "double-pancake coil"—with two windings which are arranged alongside one another, are wound in opposite senses and merge into one another adjacent to the winding former.

In one advantageous refinement of the coils, each of the windings is surrounded at least in places by reinforcement on the coil circumference. The spacers provided according to the invention may extend along the end face of the coil from the reinforcement to a winding former. The spacers are preferably attached to the coils. The spacers are preferably also arranged on both end faces of each coil thus providing a cooling gap adjacent to both end faces of each coil, for the coolant to act on and be supplied directly. Furthermore, the mutually opposite spacers can preferably be positioned aligned with one another adjacent to these end faces, as a result of which axial forces on the spacers can be transmitted only symmetrically to the end faces of the coils. In one particularly advantageous refinement, the spacers on the end faces are arranged offset at identical angles and/or on different circle segments around a central axis of the coil or of the winding former. The spacers may also be aligned parallel to one another, in which case the alignment when the coils are in the installed state is then preferably vertical. The spacers may be composed of suitable plastic such as fiber-reinforced, in particular glass-fiber-reinforced, plastic. In particular, the spacers may be manufactured from square glass-fiber sections or from glass fiber sections to form strips, such as epoxy platelets or the like, which are advantageously adhesively bonded to the outside of the end faces of the coils. In the case of coils that are encapsulated in plastic and spacers that are encapsulated in plastic or are provided with a plastic coating, the adhesive bonding can be carried out, for example, using epoxy resin. The spacers may also be composed of other suitable, non magnetic and/or electrically non-conductive materials. Suitable materials for the spacers may, in particular, be a polyethylene or a polypropylene. Corresponding materials are marketed under the trade names Kapton, Apikal or Nomex. The use of spacers composed of a material that differs from the soft magnetic material of the teeth has the advantage that the spacers cannot influence the magnetic flux in the teeth, and in particular cannot have a negative influence on it.

The teeth which extend between the coils are expediently likewise formed in an annular shape. The teeth may extend radially from the yoke to the axis, in each case to beyond the inner winding and/or the winding former of the coil. In this case, the teeth may be formed integrally on the yoke. Alternatively, they may also be composed of rings or ring packs in the form of disks, which can advantageously be slotted or partially slotted, in order to avoid eddy current losses. The teeth and/or the yoke may preferably use iron or an iron alloy as the soft-magnetic material, or may be composed of it. The yoke preferably has at least one inlet and one outlet opening for each cooling gap. It is particularly advantageous for the yoke to be provided with outlet openings at regular intervals on the circumference, so that any gas bubbles which are formed in the coolant during operation can escape from the cooling gaps through the outlet openings. In particular, the outlet openings may be arranged in an upper face of a yoke of a linear motor, in order to prevent gas bubbles, which rise upward because of gravitational forces, accumulating in the yoke.

BRIEF DESCRIPTION OF THE DRAWINGS

Further advantages and refinements of the invention will become evident from the following description of exemplary embodiments that are illustrated in the drawing of a linear motor and of primary parts according to the invention. In the drawing:

FIG. 3 shows, schematically, a second exemplary embodiment of a coil; and

FIG. 4 shows a vertical section through an upper coil half of a double-disk coil which can be used for the primary part according to the invention.

DETAILED DESCRIPTION

Figure 1:
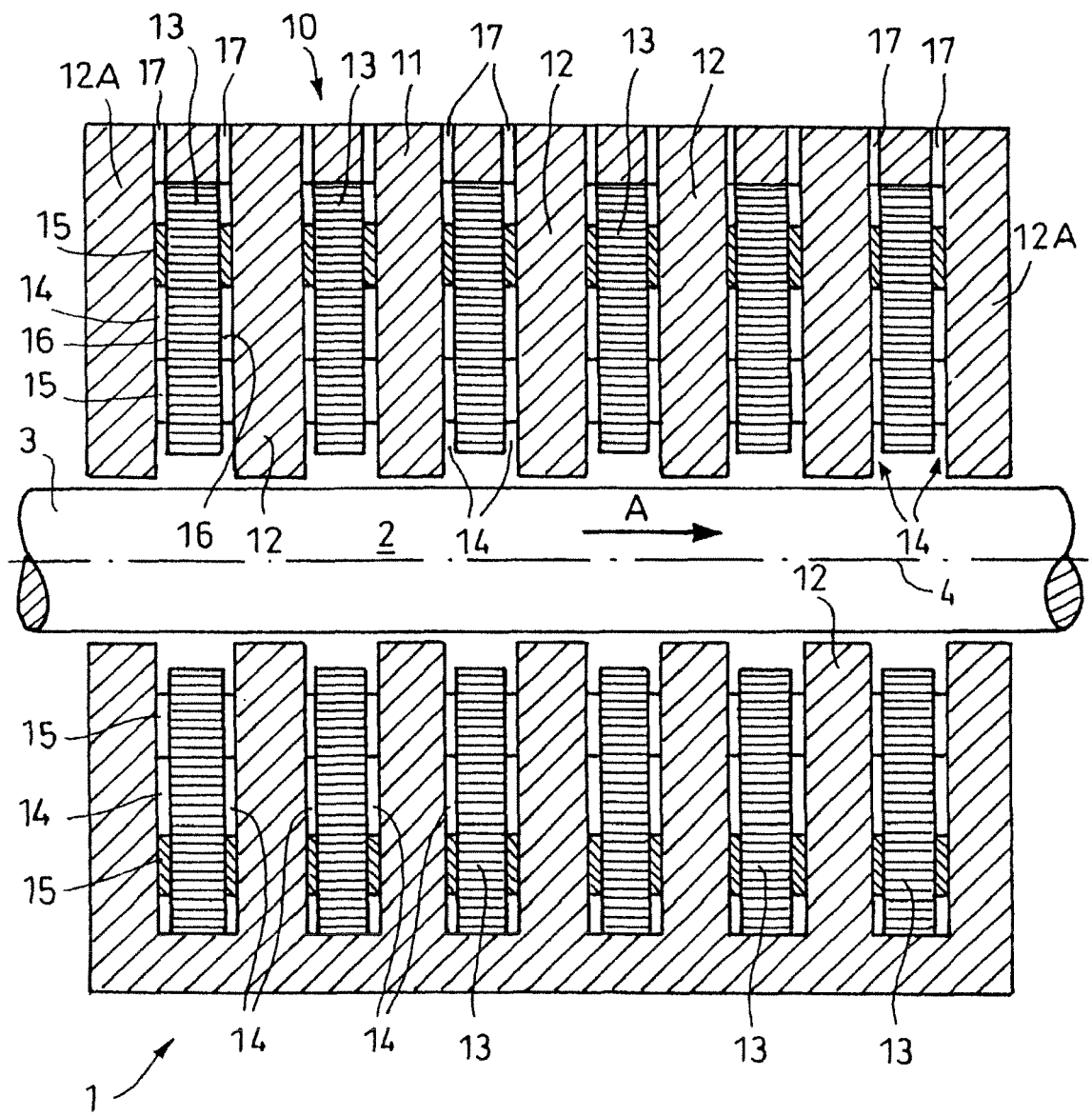
FIG. 1 shows, schematically, a longitudinal section through a linear motor having a primary part and a secondary part.

In a highly schematic simplified form, FIG. 1 shows a linear motor 1 with a primary part 10, which is cylindrical in this case and a secondary part 3, which is cylindrical in this case. Fields of application for the linear motors according to the invention are, for example, compact lifting drives for pressing installations or insertion drives for injection molding machines or the like. The secondary part 3, which is equivalent to the rotor in the case of the linear motor 1, is arranged in a receptacle 2 which in this case is formed concentrically in the primary part 10. As is known for linear motors, when current is passed through the coils 13 that are arranged in the primary part 10, the secondary part 3 is moved in the ejection direction A, along the axis 4 of the receptacle 2. Alternating current flow is used to excite the coils 13 which are produced according to the invention from windings composed of high-temperature superconductor strip conductors. The coils 13 each have densely wound windings, which are indicated only schematically and are composed of the superconductor strip conductor, in order to achieve a large number of windings in the coils 13. The current in the coil 13 produces a magnetic field which interacts with magnet poles in the secondary part 4 and therefore results in its movement in the ejection direction A.

By way of example, the linear motor 1 may be arranged in a housing which is not illustrated but forms a bath cryostat or the like, which is supplied via an opening with a cooling medium, in particular such as liquid nitrogen, in order to cool in particular the superconducting coils 13 of the primary part 10. The secondary part 3 may then be guided in bearings on the housing such that it can be moved linearly. As is known per se for cylindrical linear motors, the primary part 10 which surrounds the receptacle 2 has a yoke 11 in the form of a casing as the magnetic return path, which may be formed from a plurality of parts and essentially forms the outer circumference of the primary part 10. Each coil 13 is arranged between two teeth 12 and 12A, which can be integrally connected to the yoke 11 and may extend essentially radially between two coils 13. The two outer teeth 12A are in each case adjacent to only one coil 13. Seen in the axial or ejection direction A, the teeth 12A, 12 and the coils 13 alternate. The teeth 12, 12A are composed of a suitable soft-magnetic material and they may also be in the form of laminated ring coils or the like, and they extend in an annular and concentric form around the receptacle 2. In the radial direction, the teeth project from the yoke 11 beyond the inner faces of the coils 13.

The secondary part may be an electrically highly conductive tube or a combination of electrically highly conductive material and soft-magnetic material (asynchronous variant) or may be composed of elements with permanent excitation and with soft-magnetic material for field guidance. The elements with permanent excitation may be permanent magnets, coils with direct current flowing through them or superconductor solid bodies with a frozen-in field. It is also possible to dispense with the soft-magnetic material.

According to the invention, a cooling gap 14 is formed between each of the coils 13 and the tooth 12, 12A arranged adjacent to it, and the coolant, which is not illustrated but, in particular, is a coolant such as nitrogen, can enter the cooling gap 14 in order to cool the coils 13. The coolant cools the superconducting windings in the coils 13 to or below a temperature at which the HTS strip conductor being used becomes superconducting. The cooling gaps 14 extend parallel to the end faces 16 of the coils 13 and the side surfaces of the teeth 12, 12A, thus resulting, when seen overall in the axial direction, in an arrangement of tooth 12A, cooling gap 14, coil 13, cooling gap 14, tooth 12, cooling gap 14, etc. A plurality of spacers 15 are arranged in each cooling gap 14. Each coil 13 is provided adjacent to both end faces 16 with spacers 15 which are preferably aligned with one another opposite, in order to allow forces in the axial direction to be optimally supported. Both the end faces 16 of the coils 13 and the teeth 12 and 12A are cooled directly and over a large area by the coolant which circulates in and/or flows into the cooling gaps 14. This allows heat losses, which are created for example by hysteresis in the teeth 12, 12A or the coils 13, to be dissipated essentially directly where they occur, by means of the coolant.

The gap thickness of the cooling gaps 14 is preferably sufficiently large that, inter alia, gas bubbles which are formed when the coolant changes phase from liquid to gaseous cannot remain in the cooling gap 14 between the end face 16 of the coil 13 and the adjacent tooth 12, 12A. These gas bubbles may also be gas that has been dissolved in the surrounding liquid in such a way that excessively large bubbles do not accumulate. The gas bubbles can then rise by virtue of their own buoyancy in the coolant, possibly assisted by externally forced convection of the coolant or the like, in the cooling gap 14, and can then escape from the cooling gaps 14 through outlet openings 17 in the yoke 11 without gas bubbles accumulating in the cooling gap. With the gap thickness that is used, the gas bubbles cannot accumulate in the cooling gap 14 and therefore cannot lead to local overheating of the superconducting windings of the coils 13. In the illustrated exemplary embodiment, the yoke 11 has at least one outlet opening 17 for each cooling gap 14. The gap thickness of the cooling gaps 14, when nitrogen is used as the coolant, may in particular be between 0.5 mm and 1 mm, preferably between 0.6 mm and 0.8 mm, and in particular about 0.7 mm+/−10%.

Figure 2:
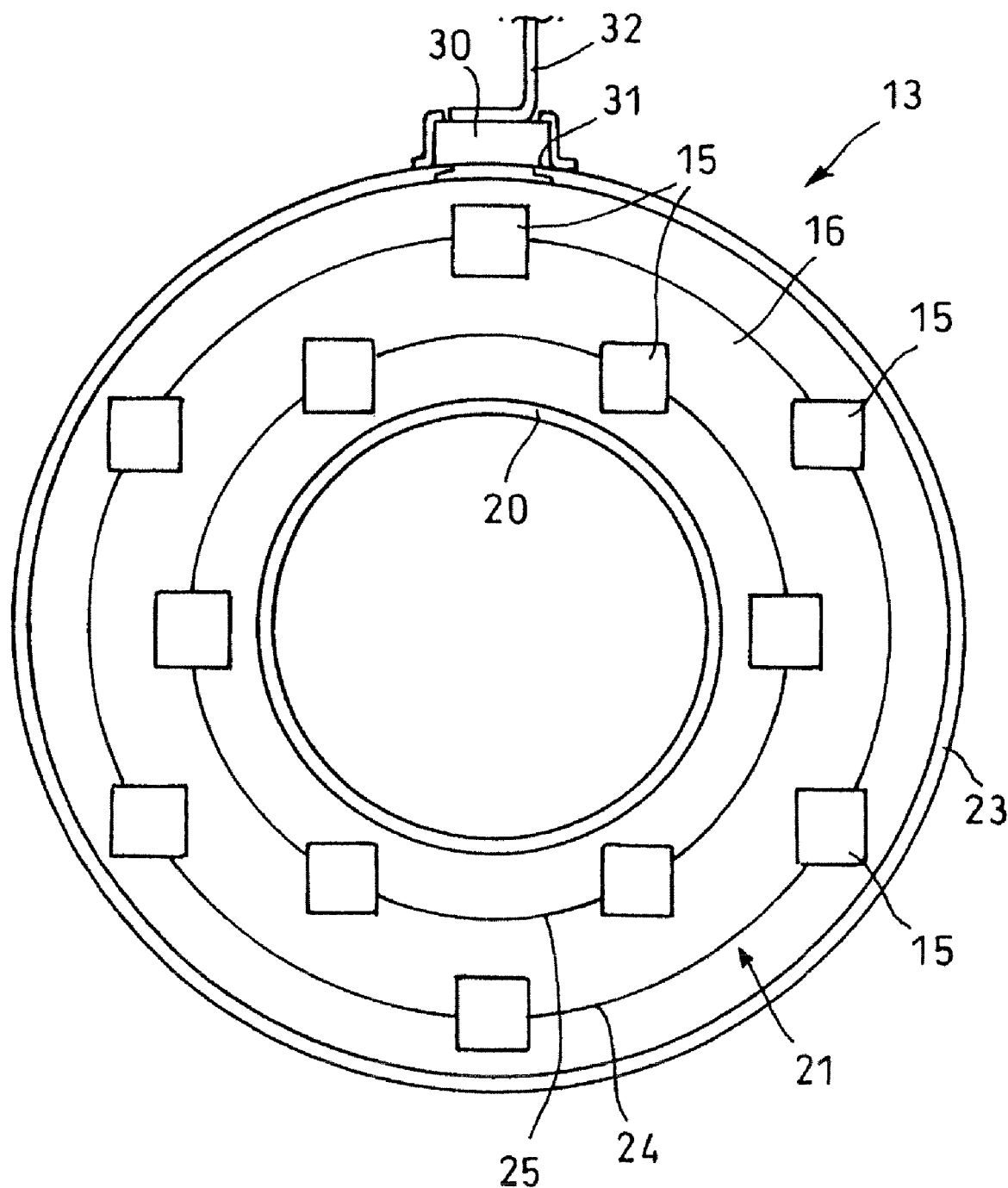
FIG. 2 shows, schematically, a view of one end face of a coil used for the primary part in FIG. 1.

FIG. 2 shows a schematic view of one of the two end faces 16 of a coil 13 which can be used advantageously for the primary part shown in FIG. 1. The coil 13 has a winding 21 which is wound on an annular winding former 20 and which is not illustrated in detail. A connecting piece 30 is used to make contact with the winding 21. The connecting piece 30 is in the form of a block in this case, is composed of copper, and is soldered on its lower face to the circumference of the winding 12. An electrically conductive supply line 32 is soldered to its upper face. An outer, fiber reinforced ring 23 rests on the circumference of the winding 21 of the coil 13 and extends from one lateral face of the connecting piece 30, around the winding 21, to the other lateral face of the connecting piece. The ends of the reinforcing ring 23 are held in recesses 31 which are formed in the lateral faces of the connecting piece, by which means projections like limbs on the connecting piece 30 are partially covered by the reinforcing ring 23 in the radial direction. The winding 21 is encapsulated in an epoxy-resin layer, as a sheath together with the winding former 20, the reinforcing ring 23 and the connecting piece 30.

Twelve square spacers 15 composed of glass fiber reinforced epoxy-resin platelets are adhesively bonded to each of the two end faces 16 of the coil 13, by means of which spacers, as illustrated in FIG. 1, the cooling gaps are formed between a tooth 12, 12A and the coil 13 when the primary part is installed. In the case of the coil 13 shown in FIG. 2, the spacers 15 are arranged on two circles 24, 25, and in each case offset at identical angles to one another. Six spacers 15 are in each case arranged on the inner circle 24, and a further six spacers 15 are arranged on the outer circle 25. Overall, the twelve spacers cover only a small area of the winding 21 which must be cooled as a priority, by the coolant, so that a coolant such as nitrogen can cool a large area of the superconducting winding 21 when a primary part is being operated with these coils 13.

In contrast to the situation when using water cooling, for example, cooling by liquid nitrogen does not involve heat being absorbed by the coolant and the use of the thermal capacity, but is based mainly on the coolant changing phase from the liquid phase to the gas phase. Gas bubbles that are created or gas dissolved in the cooling medium must in this case be able to escape from the cooling gap between the end face 16 of the coil and the tooth adjacent to it. The spacers 15 along the entire end faces 16 ensure an essentially constant cooling gap, ensuring that the gas bubbles or the dissolved gas cannot be stuck in the cooling gap by adhesion forces. The spacers also prevent gas bubbles from accumulating, which could result in local overheating of the coils 13. The thickness of the spacers 15 is therefore chosen such that the gas bubbles which are formed during heat dissipation can be transported away along the end faces 16 of the coils by virtue of their own buoyancy or by convection in the coolant.

FIG. 3 shows a second exemplary embodiment of a coil 113 with a superconducting winding 121, which is once again wound on a winding former 120. The coil 113 can also be used for a primary part or linear motor as illustrated in FIG. 1. A reinforcing ring 123 is once again arranged on the circumference of the winding of the coil 113 and is encapsulated in plastic together with the winding 121, the connecting piece 130 and the winding former 120 in order to anchor the connecting piece 130 to the winding 121 such that it can withstand tension. Eight spacers 115, 115A are adhesively bonded to the end face 116 of the coil 113. The spacers 115, 115A are in the form of strips, each run parallel to one another, and each extend from the winding former 120 to the reinforcement 123. The spacers 115, 115A are at equal distances from one another, with the outer spacers 115A being considerably longer than the inner spacers, or spacers 115 located further inward. It is self-evident that corresponding spacers are also adhesively bonded to the rearward end face, in order to directly cool the coils 113 and therefore the windings 121 on both sides with the coolant.

Finally, FIG. 4 shows a coil 213 in the form of a so called "double-pancake" or double-disk coil for a primary part according to the invention or a linear motor according to the invention. The coil 213 has two windings 221A and 221B, which merge into one another, are wound in opposite senses and are composed of a high temperature superconductor strip. The windings 221A and 221B merge into one another adjacent to the external circumference of a winding former 220, over a common inner turn 226. A respective connecting piece 230A, 230B is soldered to the external circumference of each winding 221A, 221B. The two connecting pieces 230A, 230B are arranged parallel to one another and lie beside one another, and are separated from one another by an isolating gap. The turns of the windings 221A, 221B lie densely one on top of the other and are separated from one another only by a thin insulating film 227, which is also wound on. In addition, intermediate insulation 219 is arranged between the two windings 221A, 221B and also extends between the two connecting pieces 230A, 230B. The entire coil 213 with the connecting pieces 230A, 230B soldered to it is encapsulated in a casing 240 composed of epoxy resin. The end faces 216 of the coil 213 are sealed and closed, and no coolant can pass or flow through the end faces 216. Once the coils 213 have been installed in a primary part or linear motor according to the invention, spacers 215 are once again adhesively bonded on the two end faces 216, for example by means of epoxy resin, in order to form cooling gaps.

To a person skilled in the art, numerous modifications are evident from the description and are intended to be covered by the scope of protection of the attached claims. Cylindrical primary and secondary parts are described in the exemplary embodiment. The primary and secondary parts could also be flat or only partially cylindrical. All of the spacers may, in particular, be formed from fiber-reinforced or plastic-encapsulated platelets or strips, or else from other materials such as plastic films or non-magnetic materials. The spacers may also be formed while the coils are actually being manufactured. Further inlet or outlet openings for the coolant may be provided in the yoke. The outlet openings and/or the cooling gaps may also be connected by connecting channels. The primary part or the linear motor may also be used for wire manufacture and may form a drive for a rod, tube or metal strand as the secondary part, in order to push or pull this through by means of a pulling ring.

The invention claimed is:

1. A primary part of a linear motor having a receptacle for a secondary part which can move along a shaft of the receptacle, having a plurality of coils which are arranged coaxially with respect to the receptacle, and having a yoke which surrounds the coils, with teeth which are composed of a soft-magnetic material being arranged between end faces of adjacent coils, and with the coils, which can be cooled by coolant, having at least one winding with turns of a high-temperature superconductor, wherein the coils have densely wound turns and cooling gaps in which spacers are arranged or formed between the end faces of the coils and the teeth.

2. The primary part as claimed in claim 1, wherein the cooling gaps have a gap thickness which is greater than the diameter of gas bubbles which are produced during a coolant phase transition, caused by heat dissipation, from liquid to gaseous.

3. The primary part as claimed in claim 1, wherein the coolant is liquid nitrogen.

4. The primary part as claimed in claim 1, wherein the spacers fill less than 20% of the cooling gap.

5. The primary part as claimed in claim 4, wherein the spacers fill less than 10% of the cooling gap.

6. The primary part as claimed in claim 5, wherein the spacers fill less than 5% of the cooling gap.

7. The primary part as claimed in claim 1, wherein the winding is encapsulated in plastic and/or the end faces of the coils are closed to be coolant-tight.

8. The primary part as claimed in claim 1, wherein the winding is wound from a high temperature superconductor in the form of a strip.

9. The primary part as claimed in claim 8, wherein the winding is wound with individual turns wound directly one on top of the other with the interposition of an insulation film.

10. The primary part as claimed in claim 1, wherein the winding is surrounded at least in places by a reinforcement on the coil circumference.

11. The primary part as claimed in claim 10, wherein the spacers extend on the end face from the reinforcement as far as a winding former.

12. The primary part as claimed in claim 1, wherein spacers are arranged on both opposite end faces of each coil.

13. The primary part as claimed in claim 12, wherein the spacers are positioned opposite one another on the end faces.

14. The primary part as claimed in claim 1, wherein a plurality of spacers are arranged offset at identical angles to one another on an end face and/or on different circles.

15. The primary part as claimed in claim 1, wherein the spacers are composed of plastic.

16. The primary part as claimed in claim 15, wherein the spacers are composed of fiber-reinforced plastic and/or non-magnetic material.

17. The primary part as claimed in claim 1, wherein the teeth are formed in an annular shape.

18. The primary part as claimed in claim 1, wherein the yoke has at least one inlet opening and/or one outlet opening for each of the cooling gaps.

19. The primary part as claimed in claim 1, wherein the coils are in the form of double-disk coils with two windings which are arranged alongside one another but are wound in opposite senses.

20. A linear motor, comprising:
a primary part; and
a secondary part; with
wherein the primary part is provided with a receptacle for the secondary part, which can move along a shaft in the receptacle, having a plurality of annular coils which are arranged coaxially with respect to the receptacle, and having a yoke which surrounds the coils, and with teeth which are composed of a soft magnetic material being arranged between end faces of adjacent coils, and with each coil, which can be cooled by coolant, having at least one winding with turns of a high temperature superconductor, wherein the coils have densely wound turns and cooling gaps in which spacers are arranged are formed between the end faces of the coils and the teeth.

* * * * *